United States Patent
McNutt et al.

(10) Patent No.: US 7,019,213 B1
(45) Date of Patent: Mar. 28, 2006

(54) CABLE MANAGEMENT SYSTEM

(75) Inventors: Patrick Stephen McNutt, Carnation, WA (US); Joseph Patrick Conlan, Chehalis, WA (US); Edwardo Solis, Everett, WA (US)

(73) Assignee: Leviton Manufacturing Co., Inc., Little Neck, NY (US)

( * ) Notice: Subject to any disclaimer, the term of this patent is extended or adjusted under 35 U.S.C. 154(b) by 0 days.

(21) Appl. No.: 10/940,604

(22) Filed: Sep. 13, 2004

(51) Int. Cl.
 *H02G 3/04* (2006.01)
(52) U.S. Cl. .................... 174/68.1; 174/68.3; 174/101; 174/97; 248/49
(58) Field of Classification Search ............... 174/68.3, 174/68.1, 101, 97, 72 A; 248/49; 439/719; 385/135; 361/825
See application file for complete search history.

(56) References Cited

U.S. PATENT DOCUMENTS

| | | |
|---|---|---|
| 6,468,112 B1 | 10/2002 | Follingstad et al. |
| 6,489,565 B1 * | 12/2002 | Krietzman et al. ......... 174/101 |
| 6,605,782 B1 | 8/2003 | Krietzman et al. |
| 6,766,093 B1 | 7/2004 | McGrath et al. |

* cited by examiner

*Primary Examiner*—Dhiru R. Patel
(74) *Attorney, Agent, or Firm*—George C. Rondeau, Jr.; Davis Wright Tremaine LLP

(57) ABSTRACT

A raceway assembly according to the present invention is used in conjunction with a conventional equipment rack to route cables between and otherwise to or from equipment stored in the rack. Guide members project from a trough portion of the raceway and position cables routed through spaces between the guide members. Versions of the guide members have elastic edging providing soft surfaces to reduce cable wear and otherwise protect cables from potential damage and lessening of life span. Some of the edging is formed as a substantial portion of the thickness of the guide member to provide enhanced cushioning of the cables. Versions of the guide members can include a core portion of a rigid or pliable material. Those guide members with a pliable core can be readily bent to provide enhanced support and positioning of cables being held by the guide members.

12 Claims, 8 Drawing Sheets

CABLE MANAGEMENT SYSTEM

BACKGROUND OF THE INVENTION

1. Field of the Invention

The present invention relates generally to the field of equipment racks, and more particularly to the field of raceways for routing cables and wires to equipment in the racks.

2. Description of the Related Art

Racks, frames, cabinets and the like (referred to generally herein as "racks") support computer and other electronic equipment whereas raceways route cables, wires, and the like (generally referred to hereinafter as "cables") to and from that equipment in racks. Vertical raceways route cables vertically through or adjacent to equipment racks. Such raceways may be used to route cables vertically to equipment mounted or otherwise supported on a rack from other equipment on the rack, from overhead or underfloor raceway, or the like. These cables are generally routed in the vertical direction to a point laterally adjacent to the desired equipment and then routed in the horizontal direction to the desired equipment.

An important characteristic of such raceways is the presence of a plurality of openings in the sides of the raceway through which cables may be routed, thereby facilitating more convenient access between the equipment and the interior of the raceway. Cables may be routed through the openings by positioning the cables around finger-like projections that define the openings that can help route the cables.

Unfortunately, conventional raceways may not be sufficiently adaptive to handle all cabling situations and can tension and even damage the cables.

BRIEF SUMMARY OF THE INVENTION

Aspects of the present invention resides in a raceway assembly positionable adjacent to an equipment rack. The raceway assembly includes a trough with a rear wall, a first trough side wall having a first edge portion, and a second trough side wall having a second edge portion. The raceway assembly also includes a first guide assembly having a first base support coupled to the first edge portion of the first trough side wall and a second guide assembly having a second base support coupled to the second edge portion of the second trough side wall, the first guide assembly having a first plurality of elongated guide members extending from the first base support, the first plurality of elongated guide members interspaced to form a plurality of first guide slots therebetween, the second guide assembly having a second plurality of elongated guide members extending from the second base support, the second plurality of elongated guide members interspaced to form a plurality of second guide slots therebetween, each of the first and second plurality of elongated guide members having a longitudinal core made from a pliable material that can be readily manually bent at least 180 degrees repeatedly without being fatigued.

Further aspects include the first and second plurality of elongated guide members each have a head end portion with projecting end members having at least a portion thereof made of the pliable material. Further, the pliable material is made at least in part from a foam. Further, the pliable material is made at least in part from a plastic or foam. Further, the pliable cores are at least in part elongated flat members.

Other features and advantages of the invention will become apparent from the following detailed description, taken in conjunction with the accompanying drawings.

BRIEF DESCRIPTION OF THE SEVERAL VIEWS OF THE DRAWING(S)

DETAILED DESCRIPTION OF THE INVENTION

A raceway assembly according to the present invention is used in conjunction with a conventional equipment rack to route cables between and otherwise to or from equipment stored in the conventional rack. Implementations of the raceway assembly include various guide members projecting from a trough portion of the raceway fashioned somewhat like teeth of a comb. As cables are routed through spaces between the guide members, the guide members are used to position and retain the cables. Versions of the guide members have elastic edging providing soft surfaces to reduce cable wear and otherwise protect cables from potential damage and lessening of life span. Some of the edging is formed as a substantial portion of the thickness of the guide member to provide enhanced cushioning of the cables. Versions of the guide members include a central support portion being made from either a rigid material such as a metal or hard plastic, or a pliable material. Those versions of the guide members having a central support portion made from the pliable material can be readily manually bent to provide enhanced support, positioning and retention of cables being held by the guide members. The pliable material after being bent will retain its bent shape until being subsequently re-bent or otherwise deformed. Also, the pliable material would desirably be able to be bent repeatedly with bends up to 180 degrees or more without exhibiting fatigue.

Figure 1:
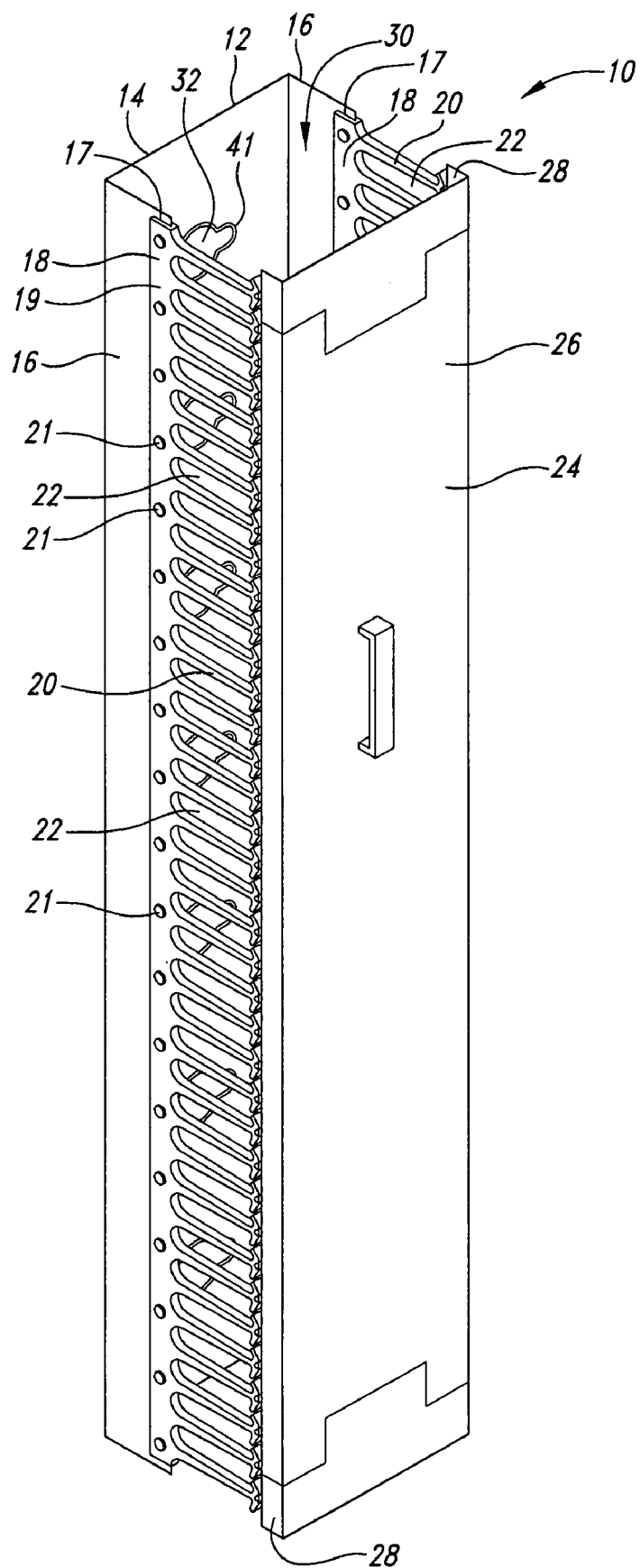
FIG. 1 is an isometric diagram illustrating an implementation of a raceway according to the present invention.

An implementation of a raceway 10 according to the present invention is shown in FIG. 1 as having a U-channel or trough portion 12 formed to include a rear wall 14 and two trough sidewalls 16 projecting orthogonal to the rear wall and each having an edge portion 17. Alternatively, an H-channel trough portion could be used. A guide assembly 18 has an elongated slotted base support 19 with a longitudinally extending slot, which receives the edge portion 17 of one of the two trough sidewalls 16. One guide assembly 18 is affixed to each trough sidewall 16 using fasteners such as rivets 21 or using drop-in guides or welding. The guide assemblies 18 have elongated fingers or guide members 20 resembling teeth of a comb being spaced apart from each other to form guide slots 22 therebetween. The guide members 20 project from the edge portions 17 of the sidewalls 16 in generally the same plane as each of the sidewalls. A cover 24 formed with a front wall 26 and two short cover sidewalls 28 projecting orthogonal to the front wall is positioned at the free ends of guide members 20. The front wall 26 of the cover 24 is positioned opposite the rear wall 14 of the trough 12. The cover 24 is removably affixed to the guide assemblies 18 by the cover sidewalls 28 frictionally engaging the distal end portions of at least some of the guide members 20.

Figure 2:
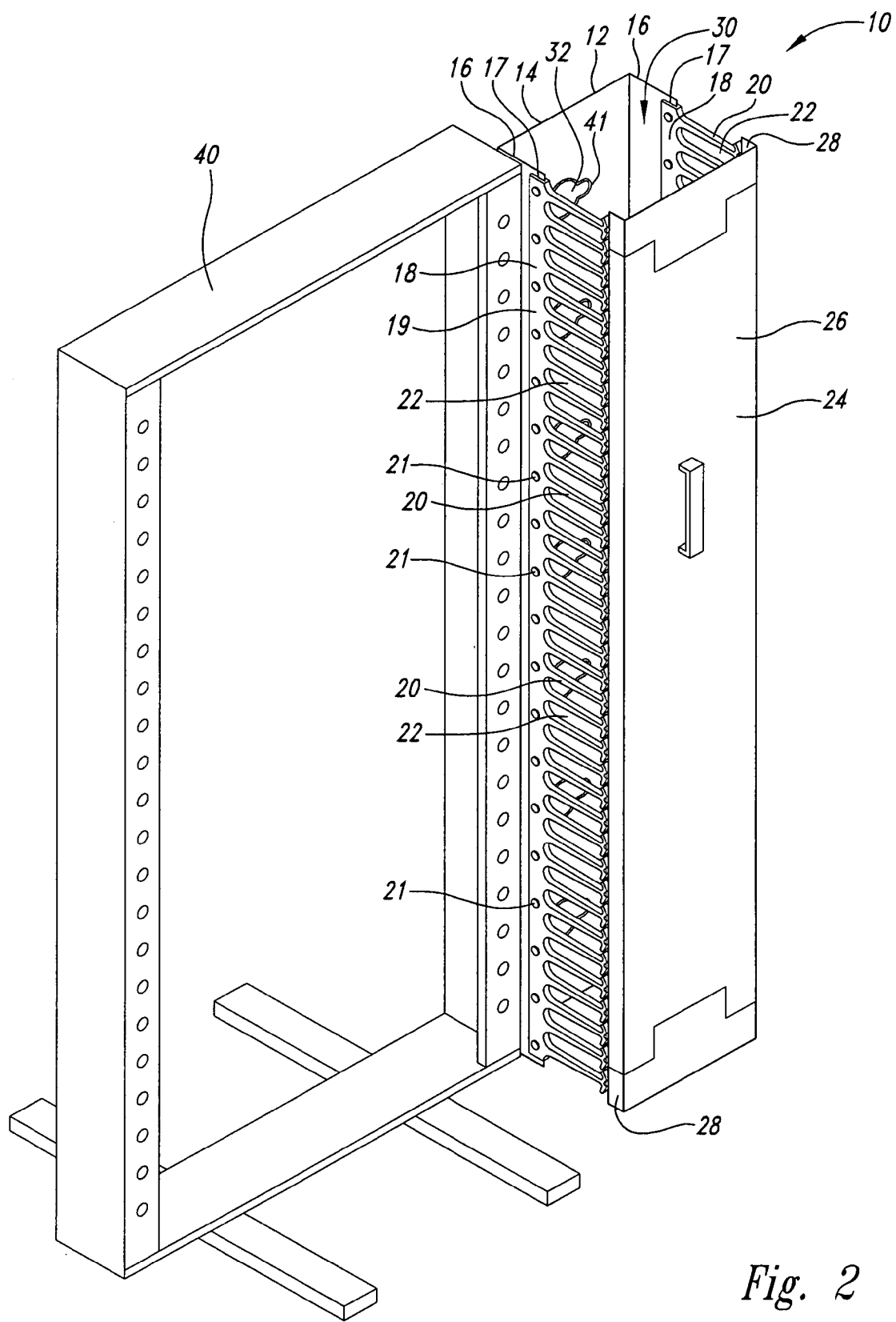
FIG. 2 is an isometric diagram of the raceway of FIG. 1 positioned adjacent to a conventional equipment rack.
Figure 3:
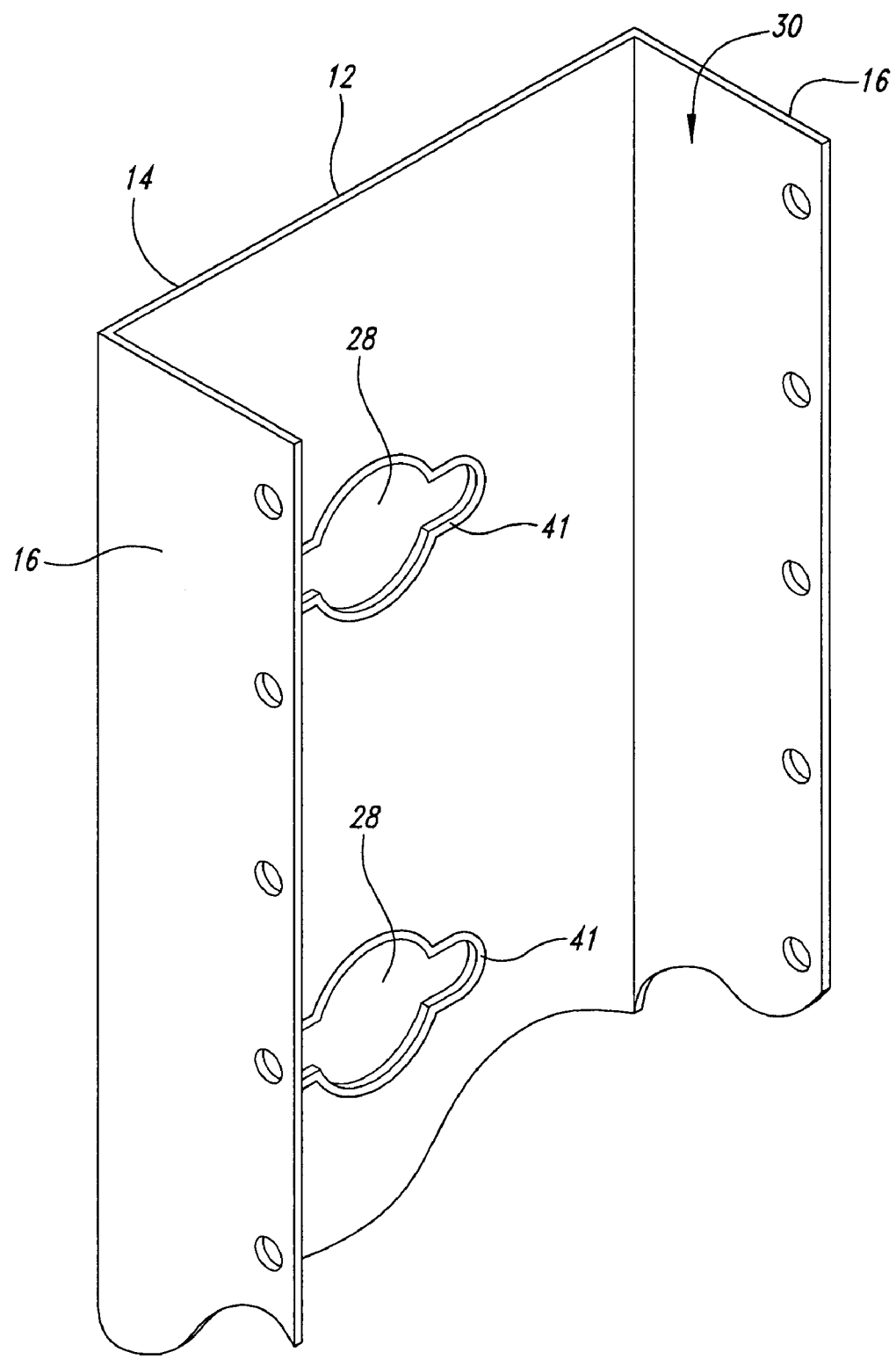
FIG. 3 is an enlarged fragmentary isometric view exploded isometric diagram of the raceway of FIG. 1.

The trough portion 12, the guide assemblies 18, and the cover 24 are assembled as the raceway 10 to define an elongated interior 30, to and from which cables can pass through the guide slots 22 of the guide assemblies and access ports 32 on the rear wall 14. A conventional equipment rack 40 is shown in FIG. 2 with the raceway 10 positioned adjacent thereto. Typically, cables routed between equipment stored on the equipment rack 40 enter and exit the interior 30 of the raceway 10 through the guide slots 22. Cables running from equipment stored on the rack 40 to other equipment not stored on the rack run into the interior 30 through the guide slots 22 and exit through one of the access ports 32. As better shown in FIG. 3, the access ports 41 are trimmed with grommets made of a soft elastic material to protect the cables running through the access ports.

Figure 4:
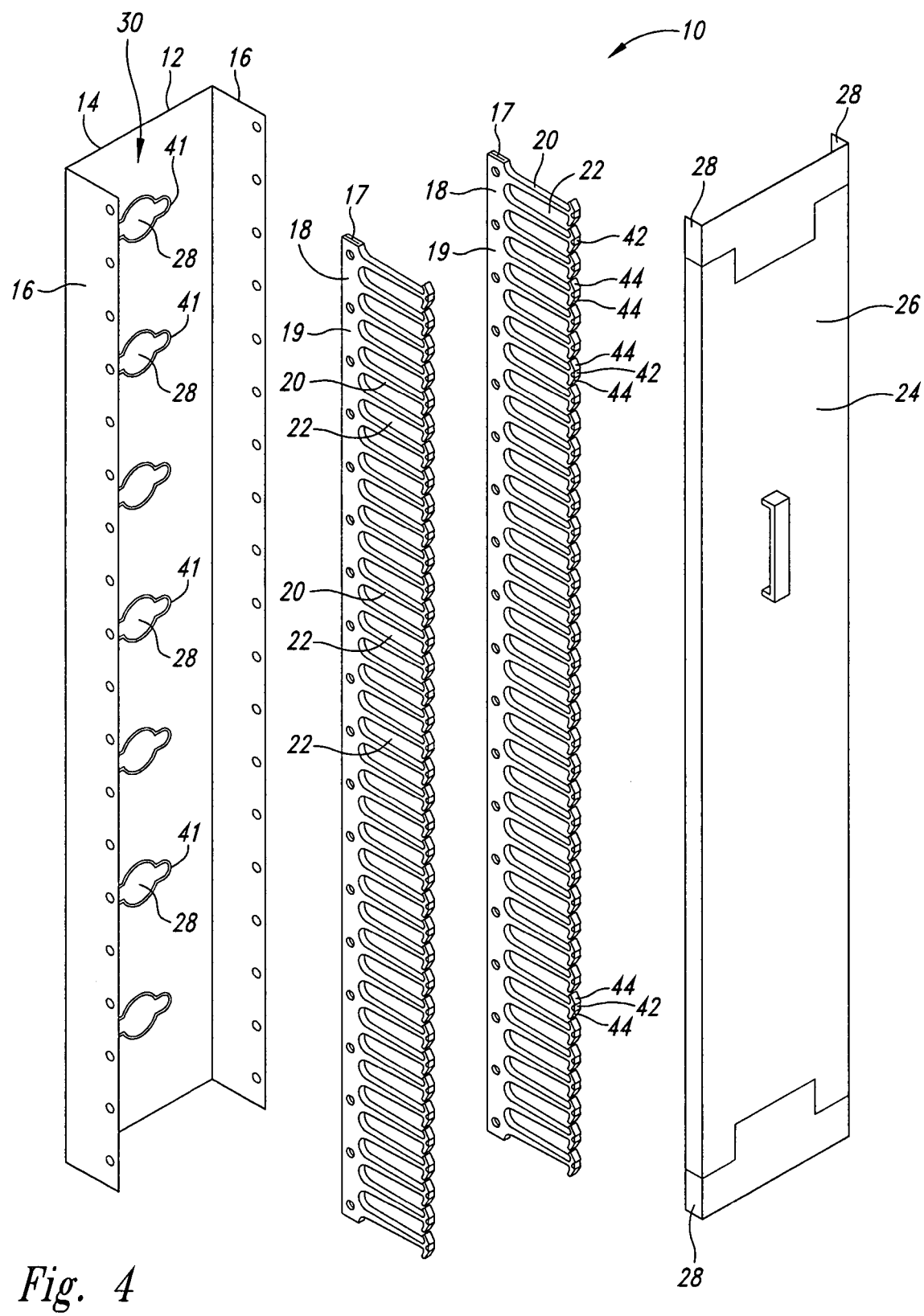
FIG. 4 is an exploded isometric view of the raceway of FIG. 1.
Figure 5:
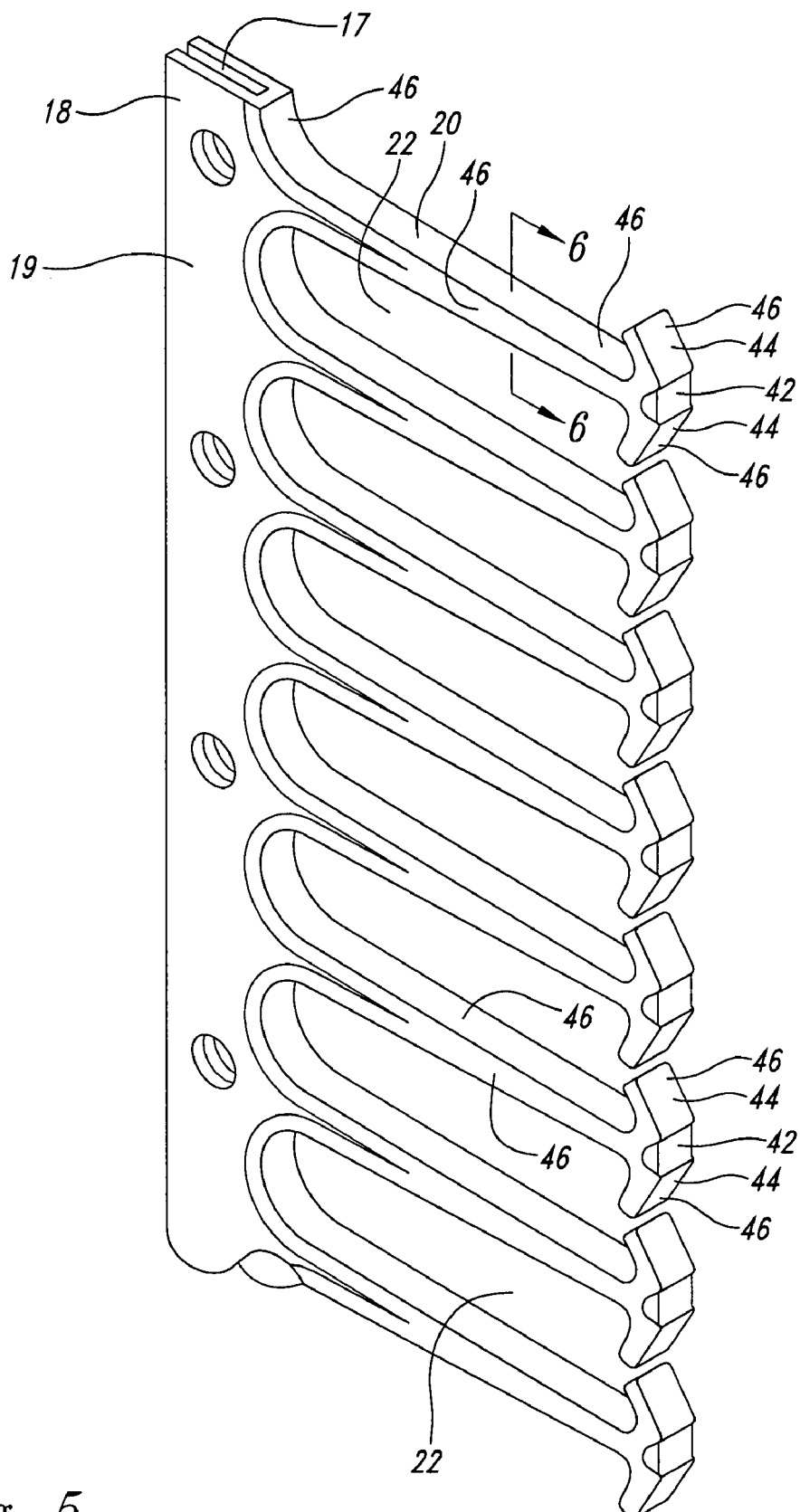
FIG. 5 is an enlarged fragmentary isometric view of a first implementation of the guide assembly of the raceway of FIG. 1.

Each of the guide members 20 has a head portion 42 at its free end, as shown in FIG. 4 and FIG. 5. Each head portion 42 has a pair of oppositely projecting end members 44 that partially define the outward ends of the two adjacent guide slots 22 and help secure the cables that are running through the guide slots. The guide members 20 are partially constructed of an elastic edging 46, made of foam, plastic or other such material, to provide soft surfaces in select portions of the guide members that generally define the guide slots 22. The elastic edging 46 can also provide soft surfaces on other surfaces of the guide members 20 such as those surfaces that may be frictionally engaged with the cover 24 or may otherwise contact the cables.

Figure 6:
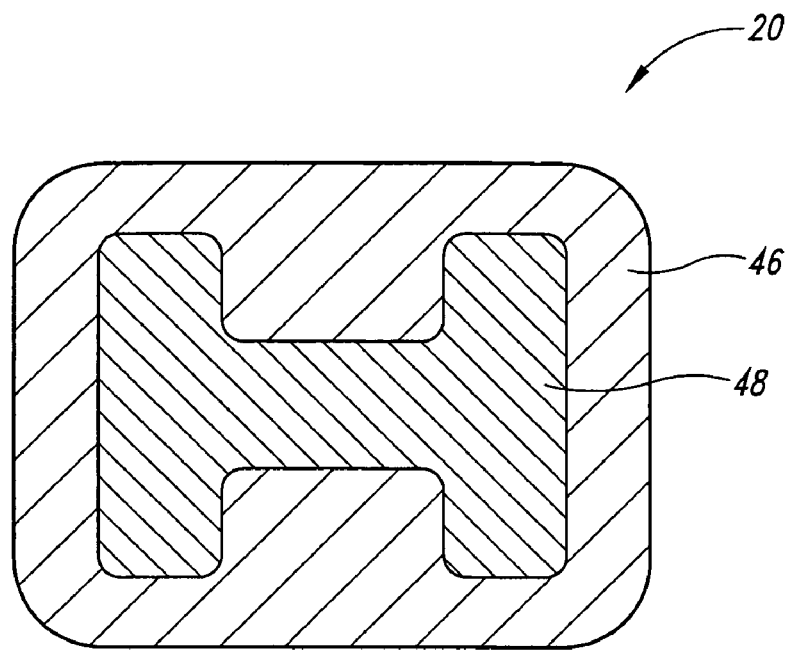
FIG. 6 is an enlarged cross-sectional view of a guide of the guide assembly of FIG. 5, taken substantially along line 6—6.
Figure 7:
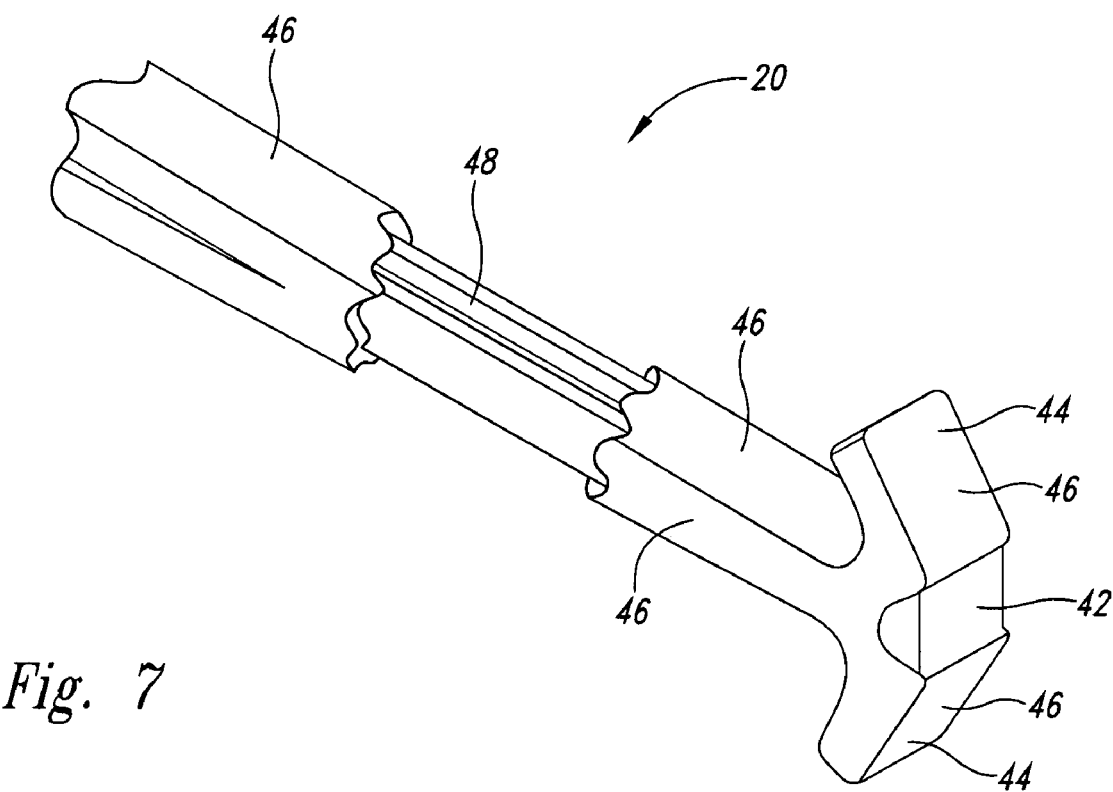
FIG. 7 is an enlarged fragmentary isometric view a guide member of the guide assembly of FIG. 5.

A first implementation of the guide members 20 is shown in FIGS. 6 and 7 as having a rigid core 48 shown in this depiction as at least partially having an I-beam construction. The core 48 is made of a rigid material such as a metal or a hard plastic. In portions of the guide member 20 that have the elastic edging 46, the elastic edging covers the guide member at a sufficient depth to provide a desired level of cushioning for protection of the cables that engage the elastic edging. As shown, in some implementations, the depth of the elastic edging 46 approximates at least one of the dimensions of the rigid core 48.

Figure 8:
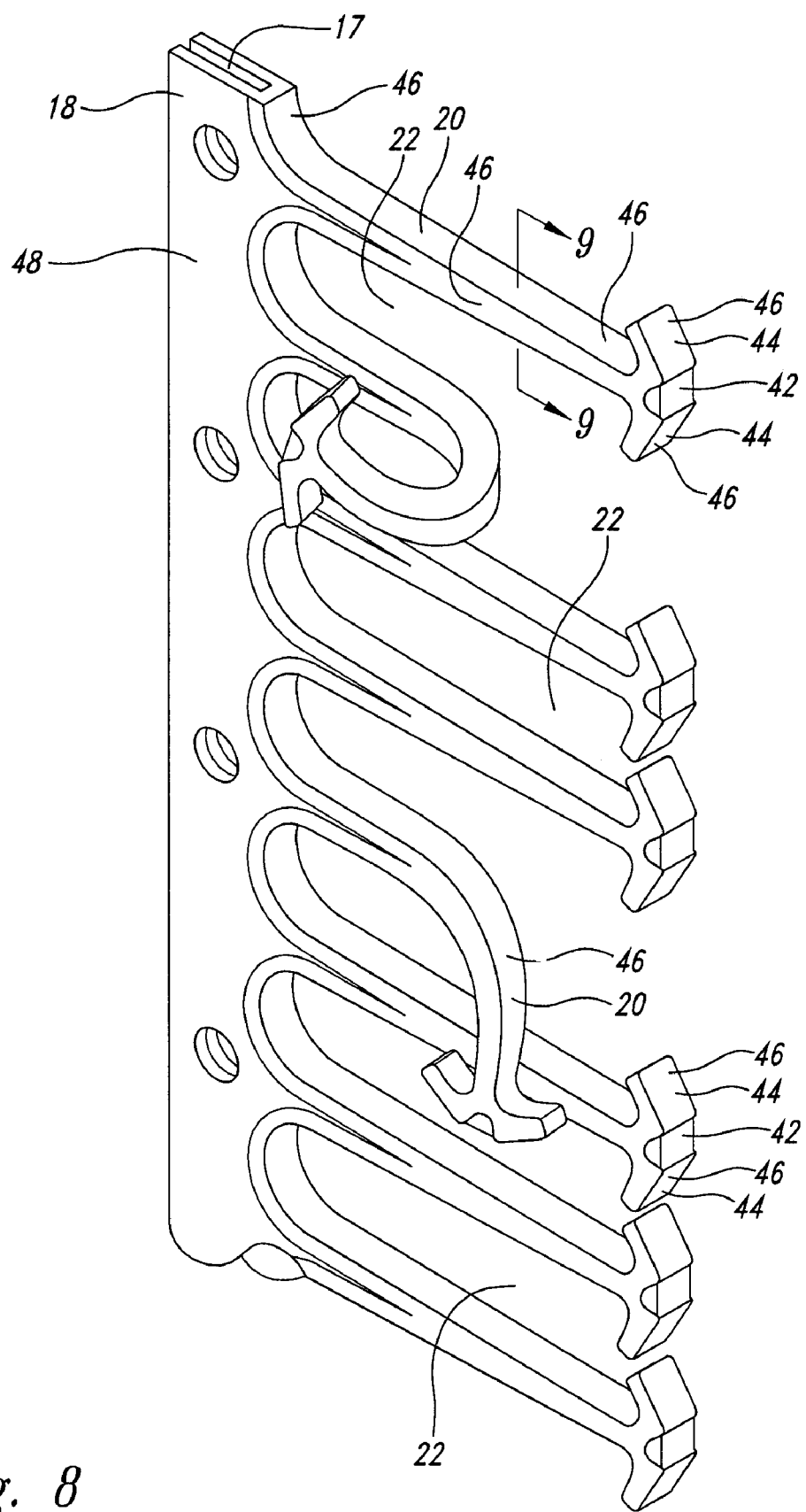
FIG. 8 is an enlarged fragmentary isometric view of a second implementation of the guide assembly of the raceway of FIG. 1.
Figure 9:
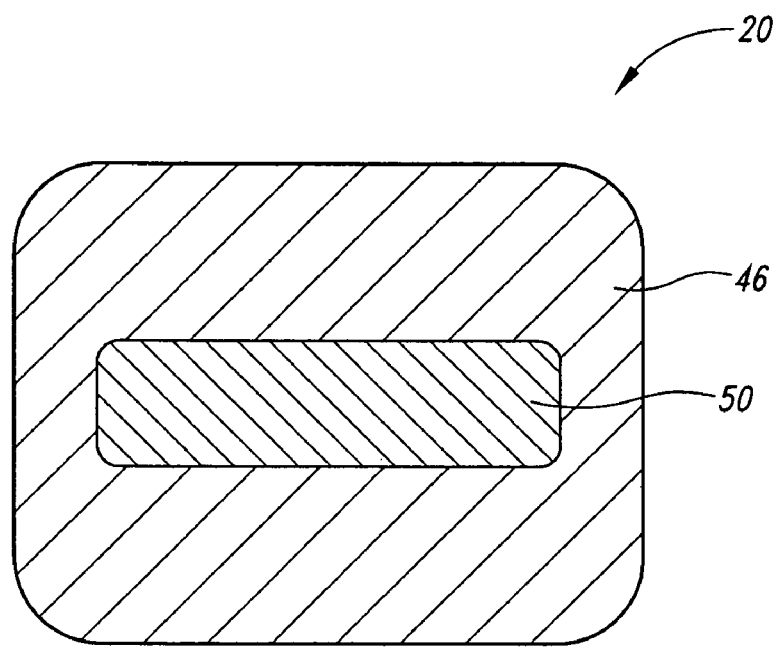
FIG. 9 is an enlarged cross-sectional view of a guide member of the guide assembly of FIG. 8, taken substantially along line 9—9.
Figure 10:
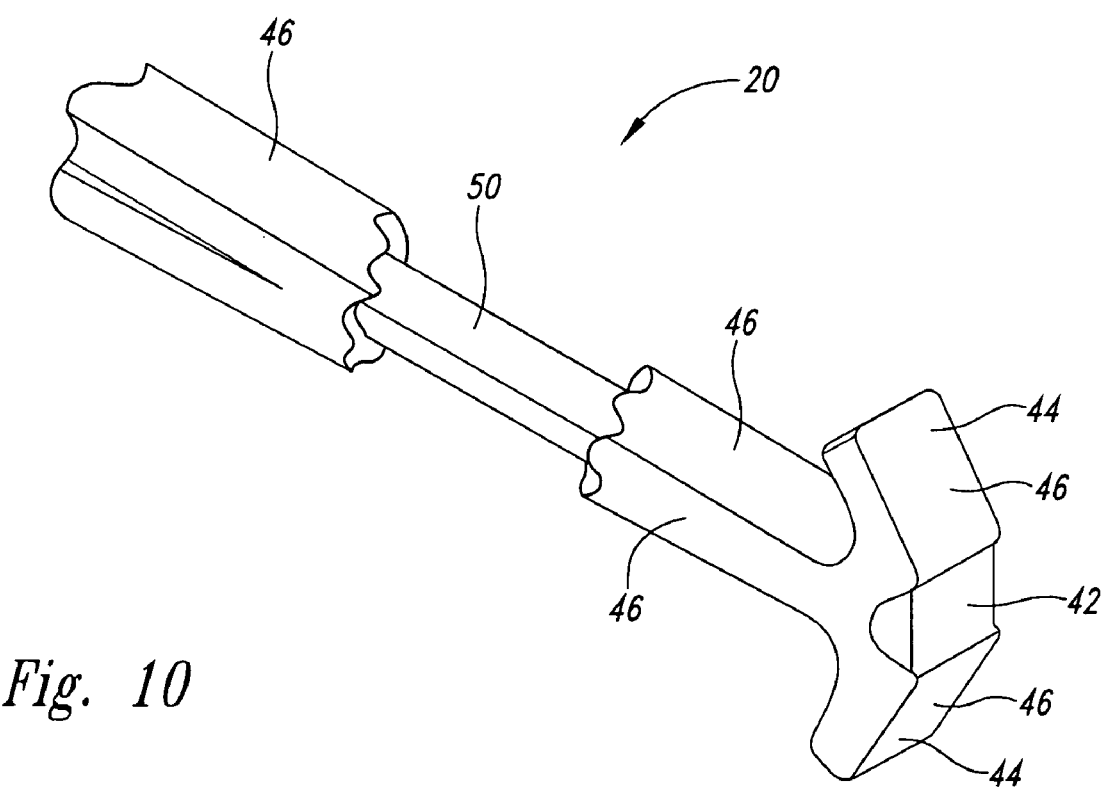
FIG. 10 is an enlarged fragmentary isometric view of a guide member of the guide assembly of FIG. 8.

A second implementation of the guide members 20 is shown in FIGS. 8–10 in which each of the guide members are sufficiently pliable to be bent back on themselves up to 180 degrees or more without exhibiting fatigue, to be bent up or down, or any combination of bending. The guide members 20 are, however, rigid enough to retain their bent positions and retain the cables during normal usage. As shown in FIGS. 9 and 10, the second implementation of the guide members 20 has a pliable longitudinal core 50 made of a material, such as a foam, plastic or other such, with sufficient ductility to be easily bent and sufficient rigidity to retain its newly bent shape. The pliable core is shown as having a substantially rectangular cross section of a flat bar, but other cross-sections are also possible while still retaining the bendable qualities described. The guide member 20 of the second implementation is also shown as having the elastic edging 46, however, in other implementations, the guide member 20 can have a thinner cover or no cover at all over the pliable core.

It will therefore be readily understood by those persons skilled in the art that the present invention is susceptible of broad utility and application. Many embodiments and adaptations of the present invention other than those herein described, as well as many variations, modifications and equivalent arrangements, will be apparent from or reasonably suggested by the present invention and the foregoing description thereof, without departing from the substance or scope of the present invention. Accordingly, while the present invention has been described herein in detail in relation to its preferred embodiments, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiments, adaptations, variations, modifications and equivalent arrangements, the present invention being limited only by the claims appended hereto and the equivalents thereof.

What is claimed is:

1. A raceway assembly positionable adjacent to an equipment rack, the raceway assembly comprising:
    a trough with a rear wall, a first trough side wall having a first edge portion, and a second trough side wall having a second edge portion; and
    a first guide assembly having a first base support coupled to the first edge portion of the first trough side wall and a second guide assembly having a second base support coupled to the second edge portion of the second trough side wall, the first guide assembly having a first plurality of elongated guide members extending from the first base support, the first plurality of elongated guide members interspaced to form a plurality of first guide slots therebetween, the second guide assembly having a second plurality of elongated guide members extending from the second base support, the second plurality of elongated guide members interspaced to form a plurality of second guide slots therebetween, each of the first and second plurality of elongated guide members having a longitudinal core made from a pliable material that can be readily manually bent at least 180 degrees repeatedly without being fatigued.

2. The raceway assembly of claim 1 wherein the first and second plurality of elongated guide members each have a head end portion with projecting end members having at least a portion thereof made of the pliable material.

3. The raceway assembly of claim 1 wherein the pliable material is made at least in part from a foam.

4. The raceway assembly of claim 1 wherein the pliable material is made at least in part from a plastic.

5. The raceway assembly of claim 1 wherein the pliable cores of the first plurality of guide members define the first guide slots and the pliable cores of the second plurality of guide members define the second guide slots.

6. The raceway assembly of claim 1 wherein the pliable cores are at least in part elongated flat members.

7. The raceway assembly of claim 1 wherein each of the first and second plurality of elongated guide members further includes an outer covering of an elastic material at least partially covering the longitudinal core for bending with the longitudinal core, the outer covering being of a different material than the longitudinal core.

8. A guide assembly for a raceway, the guide assembly comprising:
   a base support; and
   a plurality of elongated guide members coupled to the base support, each of the plurality of elongated guide members having at least a portion made from a pliable material readily manually bent and with sufficient stiffness to retain its bent shape until further bent and repeatedly bendable without being fatigued.

9. A raceway assembly for an equipment rack, the raceway comprising:
   a trough with a rear wall, and first and second side walls; and
   first and second guide assemblies, each of the first and second guide assemblies coupled to a different one of the first and second side walls, each of the first and second guide assemblies having elongated projections extending from the respective one of the first and second side walls to which coupled, each of the elongated projections having a pliable material extending through at least a portion of the elongated projection, the pliable material capable of being readily manually deformed repeatedly without being fatigued.

10. A raceway assembly positionable adjacent to an equipment rack, the raceway assembly comprising:
    a trough with a rear wall and at least one trough side wall having an edge portion; and
    at least one guide assembly having a base support coupled to the edge portion, the guide assembly having a plurality of elongated guide members extending from the base support, the plurality of elongated guide members interspaced to form a plurality of guide slots therebetween, each of the plurality of elongated guide members having a longitudinal core made from a pliable material that can be readily manually bent at least 180 degrees repeatedly without being fatigued.

11. The raceway assembly of claim 10 wherein each of the plurality of elongated guide members further includes an outer covering of an elastic material at least partially covering the longitudinal core for bending with the longitudinal core, the outer covering being of a different material than the longitudinal core.

12. A raceway assembly for an equipment rack, the raceway comprising:
    a trough with a rear wall, and at least one side wall; and
    at least one guide assembly, the guide assembly coupled to the side wall, the guide assembly having elongated projections extending from the side wall, each of the elongated projections having a pliable material extending through at least a portion of the elongated projection, the pliable material capable of being readily manually deformed repeatedly without being fatigued.

* * * * *